US011277758B2

(12) United States Patent
Futatsugi et al.

(10) Patent No.: US 11,277,758 B2
(45) Date of Patent: Mar. 15, 2022

(54) COMMUNICATION APPARATUS AND COMMUNICATION METHOD

(71) Applicant: NEC Corporation, Tokyo (JP)

(72) Inventors: Yasunori Futatsugi, Tokyo (JP); Toshiharu Ito, Tokyo (JP); Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 43 days.

(21) Appl. No.: 16/483,083

(22) PCT Filed: Feb. 14, 2018

(86) PCT No.: PCT/JP2018/004957
§ 371 (c)(1),
(2) Date: Aug. 2, 2019

(87) PCT Pub. No.: WO2018/151121
PCT Pub. Date: Aug. 23, 2018

(65) Prior Publication Data
US 2020/0015099 A1    Jan. 9, 2020

(30) Foreign Application Priority Data
Feb. 17, 2017  (JP) .............................. JP2017-028058

(51) Int. Cl.
H04W 24/02         (2009.01)
H04L 1/08          (2006.01)
(Continued)

(52) U.S. Cl.
CPC ............... H04W 24/02 (2013.01); H04L 1/08 (2013.01); H04L 43/0888 (2013.01); H04W 40/12 (2013.01)

(58) Field of Classification Search
CPC ........ H04W 24/02; H04W 40/12; H04L 1/08; H04L 43/0888
See application file for complete search history.

(56) References Cited

U.S. PATENT DOCUMENTS 7,088,701 B1* 8/2006 Attar ..................... H04L 1/0028
                                           370/347
2003/0096597 A1* 5/2003 Kar-Kin Au ......... H04W 72/1226
                                           455/412.1
(Continued)

FOREIGN PATENT DOCUMENTS

JP          55143854 A      11/1980
JP          11261535 A       9/1999
(Continued)

OTHER PUBLICATIONS

D. Giggenbach et al. ("System Aspects of Optical Leo-To-Ground Links", International Conference on Space Optics, 2016 (Year: 2016).*
(Continued)

Primary Examiner — Jeffrey M Rutkowski
Assistant Examiner — Chae S Lee
(74) Attorney, Agent, or Firm — Sughrue Mion, PLLC

(57) ABSTRACT

It is difficult in related communication apparatuses to avoid degradation of communication quality due to fading and achieve sufficient throughput performance; therefore, a communication apparatus according to an exemplary aspect of the present invention includes fade avoidance rate calculation means for calculating, from a time variation in communication quality information and a transmission pattern in transmitting a communication packet repeatedly, a fade avoidance rate of a probability that the communication packet lies outside a fade duration, with respect to each transmission pattern; throughput calculation means for calculating, from the transmission pattern and the fade avoidance rate, a throughput of the communication packet with
(Continued)

respect to each transmission pattern; and transmission pattern determination means for determining an optimum transmission pattern, of the transmission pattern, by which the throughput is maximized.

15 Claims, 11 Drawing Sheets

(51) Int. Cl.
*H04L 12/26* (2006.01)
*H04W 40/12* (2009.01)
*H04L 43/0888* (2022.01)

(56) References Cited

U.S. PATENT DOCUMENTS

| | | | | |
|---|---|---|---|---|
| 2011/0007779 | A1* | 1/2011 | Nanri | H04L 1/1893 375/133 |
| 2011/0081865 | A1* | 4/2011 | Xiao | H04W 72/1205 455/63.1 |
| 2014/0064120 | A1* | 3/2014 | Sethuraman | H04L 1/0025 370/252 |
| 2014/0233960 | A1* | 8/2014 | Peach | H04B 10/1129 398/119 |

FOREIGN PATENT DOCUMENTS

| | | |
|---|---|---|
| JP | 2002246967 A | 8/2002 |
| JP | 2015130626 A | 7/2015 |
| WO | 2012127591 A1 | 9/2012 |
| WO | 2016117199 A1 | 7/2016 |

OTHER PUBLICATIONS

International Search Report dated May 15, 2018, in International Application No. PCT/JP2018/004957.
Written opinion of the International Searching Authority dated May 15, 2018 in International Application No. PCT/JP2018/004957.
D. Giggenbach et al., "System Aspects of Optical Leo-To-Ground Links", International Conference on Space Optics, 2016, (9 pages total).

* cited by examiner

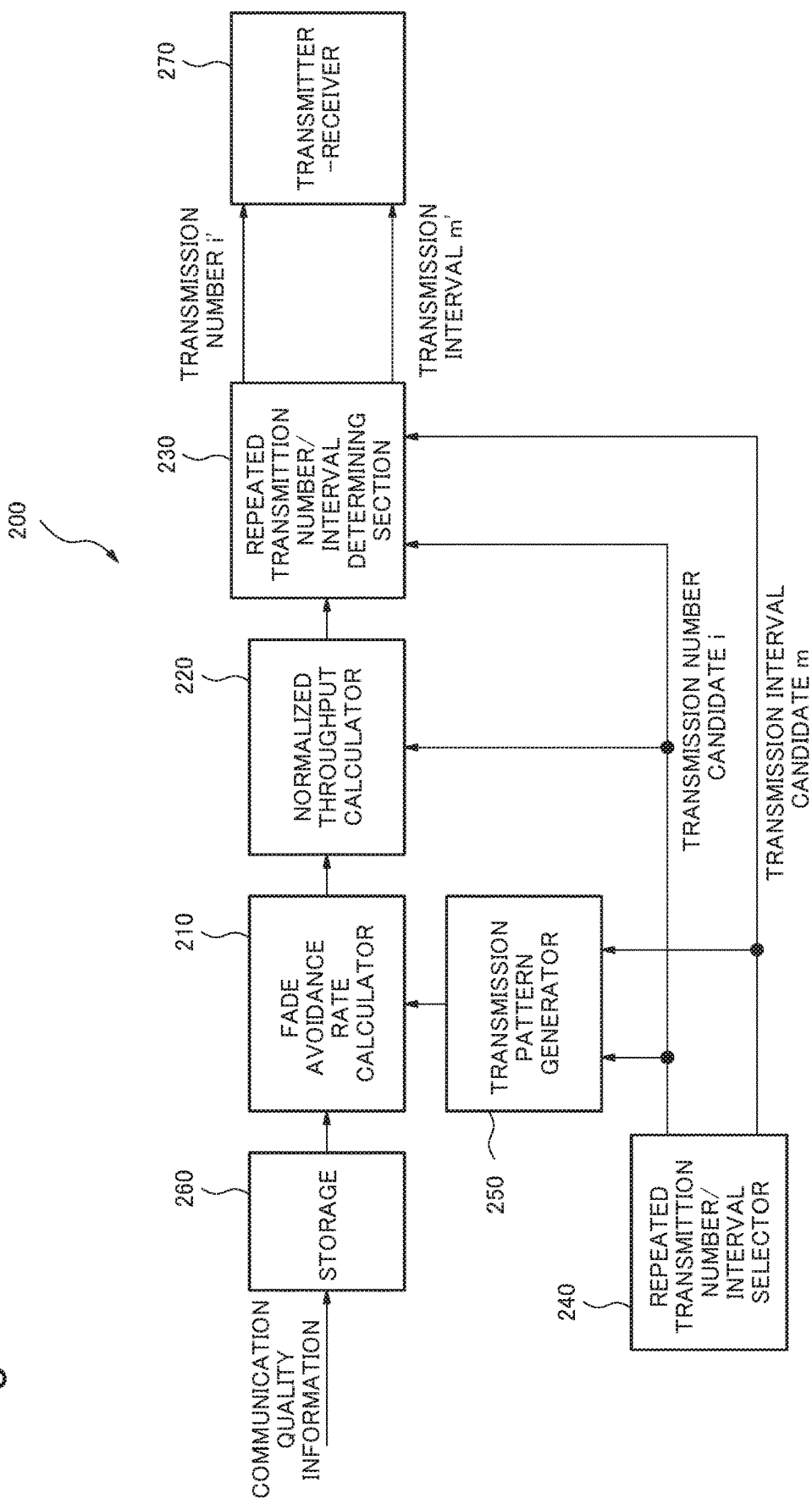

Fig. 3

| | | | | | | | | |
|---|---|---|---|---|---|---|---|---|
| ORIGINAL PACKET SEQUENCE | 1 | 2 | 3 | 4 | 5 | 6 | 7 | 8 | 9 |
| REPEATED TRANSMISSION NUMBER i=1, TRANSMISSION INTERVAL m=1 | 1 | 1 | 2 | 2 | 3 | 3 | 4 | 4 | 5 |
| REPEATED TRANSMISSION NUMBER i=1, TRANSMISSION INTERVAL m=2 | 1 | 2 | 1 | 2 | 3 | 4 | 3 | 4 | 5 |
| REPEATED TRANSMISSION NUMBER i=1, TRANSMISSION INTERVAL m=3 | 1 | 2 | 3 | 1 | 2 | 3 | 4 | 5 | 6 |
| REPEATED TRANSMISSION NUMBER i=2, TRANSMISSION INTERVAL m=1 | 1 | 1 | 1 | 2 | 2 | 2 | 3 | 3 | 3 |
| REPEATED TRANSMISSION NUMBER i=2, TRANSMISSION INTERVAL m=2 | 1 | 2 | 1 | 2 | 1 | 2 | 3 | 4 | 3 |
| REPEATED TRANSMISSION NUMBER i=2, TRANSMISSION INTERVAL m=3 | 1 | 2 | 3 | 1 | 2 | 3 | 1 | 2 | 3 |

COMMUNICATION APPARATUS AND COMMUNICATION METHOD

This application is a National Stage Entry of PCT/JP2018/004957 filed on Feb. 14, 2018, which claims priority from Japanese Patent Application 2017-028058 filed on Feb. 17, 2017, the contents of all of which are incorporated herein by reference, in their entirety.

TECHNICAL FIELD

The present invention relates to communication apparatuses and communication methods and, in particular, to a communication apparatus and a communication method that use a transmission path with fading.

BACKGROUND ART

It is expected that, by applying free space optics (FSO) to the communication between an artificial satellite and the ground, massive data such as ground-based observation data observed in an artificial satellite are transmitted at high speed. In FSO between an artificial satellite and the ground, signal light passes through the atmosphere; consequently, a fading arises that a reception intensity of signal light varies due to a change in the state of the atmosphere. When a transmission path with fading is used and a communication packet is transmitted within a fade time when communication quality degrades due to a large attenuation of reception intensity, it is impossible to demodulate the communication packet correctly on the reception side.

FIG. 11 schematically illustrates a relation between fading and reachability of a communication packet. As illustrated in the figure, it is impossible for a communication packet 1 transmitted within a fade time when communication quality degrades due to fading to reach the reception side. In contrast, it is possible for a communication packet 2 transmitted outside the fade time to reach the reception side.

As measures against the above-mentioned fading in a transmission path, a repeated transmission technique is being studied that same packets are transmitted multiple times.

Examples of such a repeated transmission technique are described in Patent Literature 1 and Patent Literature 2.

A base station described in Patent Literature 1 includes a measuring unit and a control unit. The measuring unit uses a predetermined threshold value to determine reception quality of a predetermined number of data for each predetermined time interval that are received from a mobile station. The control unit outputs first notification information to cause the mobile station to transmit the same data, for the predetermined time interval, when the reception quality of the data measured in the measurement unit is determined to be low. When the reception quality of the data measured in the measurement unit is determined to be high, the control unit outputs second notification information to cause the mobile station to transmit a plurality of data that are different from one another, for the predetermined time interval.

In other words, the base station described in Patent Literature 1 reduces the number of times of transmission of the same packet when the reception quality is excellent, and improves the transmission performance by increasing the number of times of transmission of the same packet when the reception quality is poor.

In a radio communication system described in Patent Literature 2, a transmission apparatus is configured to transmit data in a frame format of radio communication based on a time diversity system, modifying a transmission time interval between an initial transmission and a retransmission. A reception device is configured to modify a frame format of reception corresponding to the modification on the frame format on the transmission apparatus side. The transmission apparatus is configured to set an optimum transmission time interval of data, based on the information about surrounding environment, and transmit setting information to the reception apparatus.

In other words, the radio communication system described in Patent Literature 2 is configured to determine a retransmission time interval of the same packets based on surrounding environment information typified by a sea wave period, in order to cope with a fading variation during maritime propagation in wireless communication using radio waves.

CITATION LIST

Patent Literature

[PTL 1] WO 2012/127591
[PLL 2] Japanese Unexamined Patent Application Publication No. 2002-246967

SUMMARY OF INVENTION

Technical Problem

As mentioned above, the base station described in Patent Literature 1 is configured to determine the number of times of transmission of the same packet depending on the reception quality. The radio communication system described in Patent Literature 2 is configured to determine a transmission interval of the same packets based on surrounding environment information such as a sea wave period.

Those repeated transmission techniques make it possible to avoid degradation of communication quality due to fading. However, it is difficult in the above-mentioned related communication apparatuses to achieve optimum throughput performance because no regard is given to suppression of a decline in throughput due to retransmission of the same communication packet.

As described above, there has been the problem that it is difficult in related communication apparatuses to avoid degradation of communication quality due to fading and achieve sufficient throughput performance.

The object of the present invention is to provide a communication apparatus and a communication method that solve the above-mentioned problem that it is difficult in related communication apparatuses to avoid degradation of communication quality due to fading and achieve sufficient throughput performance.

Solution to Problem

A communication apparatus according to an exemplary aspect of the present invention includes fade avoidance rate calculation means for calculating, from a time variation in communication quality information and a transmission pattern in transmitting a communication packet repeatedly, a fade avoidance rate of a probability that the communication packet lies outside a fade duration, with respect to each transmission pattern; throughput calculation means for calculating, from the transmission pattern and the fade avoidance rate, a throughput of the communication packet with respect to each transmission pattern; and transmission pattern determination means for determining an optimum transmission pattern, of the transmission pattern, by which the throughput is maximized.

A communication method according to an exemplary aspect of the present invention includes calculating, from a time variation in communication quality information and a transmission pattern in transmitting a communication packet repeatedly, a fade avoidance rate of a probability that the communication packet lies outside a fade duration, with respect to each transmission pattern; calculating, from the transmission pattern and the fade avoidance rate, a throughput of the communication packet with respect to each transmission pattern; and determining an optimum transmission pattern, of the transmission pattern, by which the throughput is maximized.

Advantageous Effects of Invention

According to the communication apparatus and the communication method of the present invention, it is possible to avoid degradation of communication quality due to fading and achieve sufficient throughput performance.

BRIEF DESCRIPTION OF DRAWINGS

FIG. 2 is a block diagram illustrating a configuration of a communication apparatus according to a second example embodiment of the present invention.

FIG. 3 is a diagram illustrating specific examples of transmission patterns generated by a transmission pattern generator included in the communication apparatus according to the second example embodiment of the present invention.

EXAMPLE EMBODIMENT

Example embodiments of the present invention will be described below with reference to the drawings.

First Example Embodiment

Figure 1:
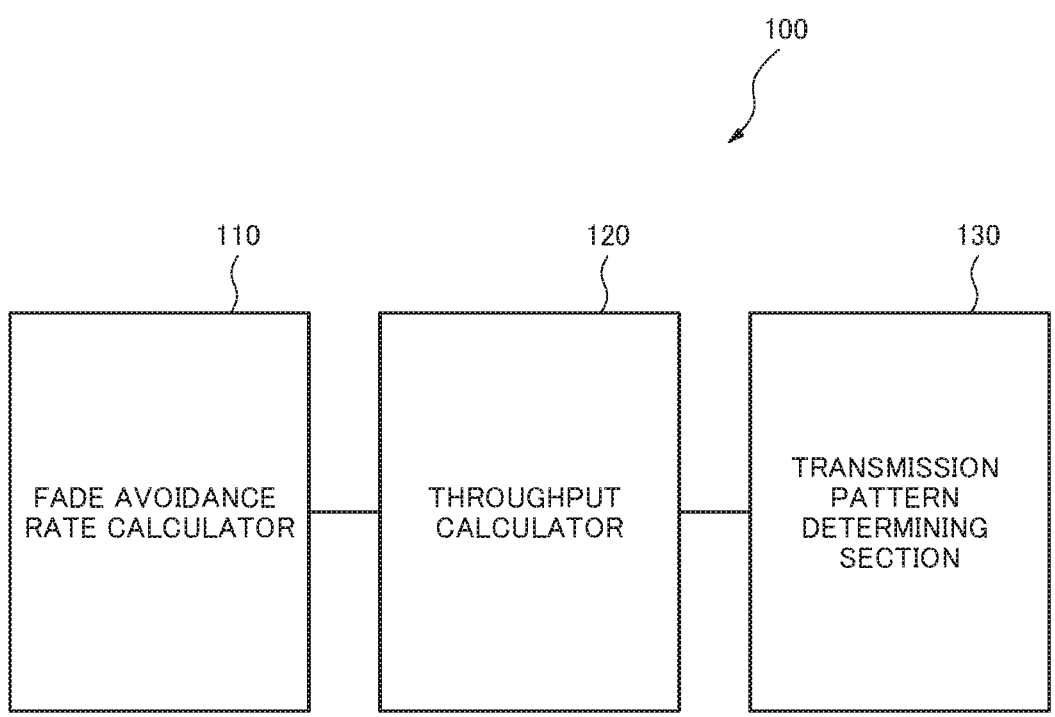
FIG. 1 is a block diagram illustrating a configuration of a communication apparatus according to a first example embodiment of the present invention.

FIG. 1 is a block diagram illustrating a configuration of a communication apparatus 100 according to a first example embodiment of the present invention. The communication apparatus 100 includes a fade avoidance rate calculator (fade avoidance rate calculation means) 110, a throughput calculator (throughput calculation means) 120, and a transmission pattern determining section (transmission pattern determination means) 130.

The fade avoidance rate calculator 110 calculates, from a time variation in communication quality information and a transmission pattern in transmitting a communication packet repeatedly, a fade avoidance rate of a probability that the communication packet lies outside a fade duration, with respect to each transmission pattern. The throughput calculator 120 calculates, with respect to each transmission pattern, a throughput of the communication packet, from the transmission pattern and the fade avoidance rate. The transmission pattern determining section 130 determines an optimum transmission pattern, of the transmission pattern, by which the throughput is maximized.

The time variation in communication quality information includes a time variation in a signal/noise (S/N) ratio of a signal and a time variation in signal intensity, for example.

Next, a communication method according to the present example embodiment will be described.

In the communication method of the present example embodiment, first, from a time variation in communication quality information and a transmission pattern in transmitting a communication packet repeatedly, a fade avoidance rate of a probability that the communication packet lies outside a fade duration is calculated with respect to each transmission pattern. A throughput of the communication packet is calculated with respect to each transmission pattern, from the transmission pattern and the fade avoidance rate. And an optimum transmission pattern by which the throughput is maximized is determined among the transmission patterns.

As mentioned above, the communication apparatus 100 and the communication method according to the present example embodiment are configured to calculate, with respect to each transmission pattern, a throughput of the communication packet, from the transmission pattern and the fade avoidance rate, and determine, among the transmission patterns, an optimum transmission pattern by which the throughput is maximized. Therefore, according to the communication apparatus 100 and the communication method according to the present example embodiment, it is possible to avoid degradation of communication quality due to fading and achieve sufficient throughput performance.

Second Example Embodiment

Next, a second example embodiment of the present invention will be described. FIG. 2 is a block diagram illustrating a configuration of a communication apparatus 200 according to the second example embodiment of the present invention.

The communication apparatus 200 according to the present example embodiment includes a fade avoidance rate calculator 210, a normalized throughput calculator 220 serving as a throughput calculation means, and a repeated transmission number/interval determining section 230 serving as a transmission pattern determination means. The communication apparatus 200 of the present example embodiment further includes a repeated transmission number/interval selector (repeated transmission number/interval selection means) 240 and a transmission pattern generator (transmission pattern generation means) 250. FIG. 2 illustrates the configuration further including a storage (storage means) 260 and a transmitter-receiver (transmitting-receiving means) 270.

The communication apparatus 200 according to the present example embodiment determines the number of times of repeated transmission (the number of times of retransmission) and a transmission interval by which a normalized throughput is maximized, with reference to a time variation (history) in communication quality such as optical intensity and signal-to-noise ratio (SNR). A packet is transmitted and received based on the number of times of transmission and the transmission interval.

In the communication apparatus 200 of the present example embodiment, the storage 260 stores a time variation (history) of communication quality information. In other words, the storage 260 receives input of communication quality information and stores the communication quality information for a predetermined time. The storage 260 outputs the history of the communication quality information for the predetermined time to the fade avoidance rate calculator 210.

The repeated transmission number/interval selector 240 selects a combination of the number of times of repeated transmission and a repeated transmission interval of communication packets. That is to say, the repeated transmission number/interval selector 240 extracts a repeated transmission number candidate i and a transmission interval candidate m from among combinations of the number of times of repeated transmission and a transmission interval of communication packets. There are a lot of combinations of the number of times of repeated transmission and a transmission interval. However, if throughputs are calculated for all the combinations of the number of times of repeated transmission and a transmission interval, the amount of computation becomes vast. Therefore, it is preferable for the repeated transmission number/interval selector 240 to output a transmission interval candidate m obtained by thinning a transmission interval, for example.

The repeated transmission number/interval selector 240 outputs a repeated transmission number candidate i to the transmission pattern generator 250, the normalized throughput calculator 220, and the repeated transmission number/interval determining section 230. The repeated transmission number/interval selector 240 outputs a transmission interval candidate m to the transmission pattern generator 250 and the repeated transmission number/interval determining section 230.

The transmission pattern generator 250 generates a transmission pattern based on the combination selected by the repeated transmission number/interval selector 240. Specifically, the transmission pattern generator 250 receives input of the repeated transmission number candidate i and the transmission interval candidate m from the repeated transmission number/interval selector 240, and generates a transmission pattern according to the repeated transmission number candidate i and the transmission interval candidate m. A specific example of the transmission pattern according to the repeated transmission number candidate i and the transmission interval candidate m will be described below using FIG. 3. The transmission pattern generator 250 outputs the generated transmission pattern to the fade avoidance rate calculator 210.

The fade avoidance rate calculator 210 calculates, from a time variation in communication quality information and a transmission pattern in transmitting a communication packet repeatedly, a fade avoidance rate with respect to each combination selected by the repeated transmission number/interval selector 240. Specifically, the fade avoidance rate calculator 210 receives input of a history (time variation) of communication quality information for a predetermined time from the storage 260, and receives a transmission pattern from the transmission pattern generator 250.

The fade avoidance rate calculator 210 calculates a fade avoidance rate of a possibility that the same communication packet lies outside a fade duration with respect to each transmission pattern to be determined based on the above-described combination. The fade avoidance rate can be calculated, for example, as follows. First, communication quality information is binarized according to a threshold and converted to an information sequence including "0" indicating a disconnection state or "1" indicating a connection state. A transmission pattern in which the same packet appears is represented by "0" or "1". When the result obtained by multiplying the binarized communication quality information and the transmission pattern in the calculation range of the fade avoidance rate is "0", it is determined that the packet lies within a fade duration, and that the packet lies outside a fade duration when the multiplication result is not "0". The above-described calculation is executed repeatedly sliding a transmission pattern in a time direction, which makes it possible to obtain a probabilistic fade avoidance rate.

The fade avoidance rate calculator 210 outputs the calculated fade avoidance rate to the normalized throughput calculator 220.

The normalized throughput calculator 220 calculates, from the number of times of repeated transmission and the fade avoidance rate, a throughput of the communication packet with respect to each transmission pattern determined based on the above-described combination. That is to say, the normalized throughput calculator 220 receives input of the fade avoidance rate from the fade avoidance rate calculator 210, and receives input of the repeated transmission number candidate i from the repeated transmission number/interval selector 240. The normalized throughput calculator 220 calculates, based on the repeated transmission number candidate i and the fade avoidance rate, a normalized throughput with respect to each combination of the repeated transmission number candidate i and the transmission interval candidate m. The normalized throughput T(i, m) with the repeated transmission number candidate i and the transmission interval candidate m is expressed, for example, by following formula (1), where the fade avoidance rate is represented by r(i, m).

$$T(i, m) = \frac{r(i, m)}{i+1} \quad (1)$$

The normalized throughput calculator 220 outputs the calculated normalized throughput to the repeated transmission number/interval determining section 230.

The repeated transmission number/interval determining section 230 determines, among the above-described combinations for determining the transmission pattern, an optimum transmission pattern based on an optimum combination by which the throughput is maximized. Specifically, the repeated transmission number/interval determining section 230 receives input of a normalized throughput T from the normalized throughput calculator 220, and receives input of the repeated transmission number candidate i and the transmission interval candidate m from the repeated transmission number/interval selector 240. The repeated transmission number/interval determining section 230 selects a repeated transmission number i' and a transmission interval m' by which the normalized throughput T is maximized, and outputs the selected repeated transmission number i' and the transmission interval m' to the transmitter-receiver 270.

The transmitter-receiver 270 transmits and receives a communication packet based on the optimum transmission pattern. Specifically, the transmitter-receiver 270 receives input of the repeated transmission number i' and the transmission interval m' by which to achieve the optimum transmission pattern from the repeated transmission number/interval determining section 230, and transmits and receives a communication packet based on the repeated transmission number i' and the transmission interval m'.

FIG. 3 illustrates specific examples of transmission patterns according to a repeated transmission number candidate i and a transmission interval candidate m, which are generated by the transmission pattern generator 250. When the repeated transmission number i is increased with regard to an initial packet sequence (original packet sequence), the number of times of the appearance of the same packet increases. It is understood that an interval at which the same packet appears increases when the transmission interval m is increased.

Next, using FIG. 4, the method will be described by which the repeated transmission number/interval determining section 230 determines a combination of a transmission number candidate i and a transmission interval candidate m by which a throughput is maximized.

Figure 4:
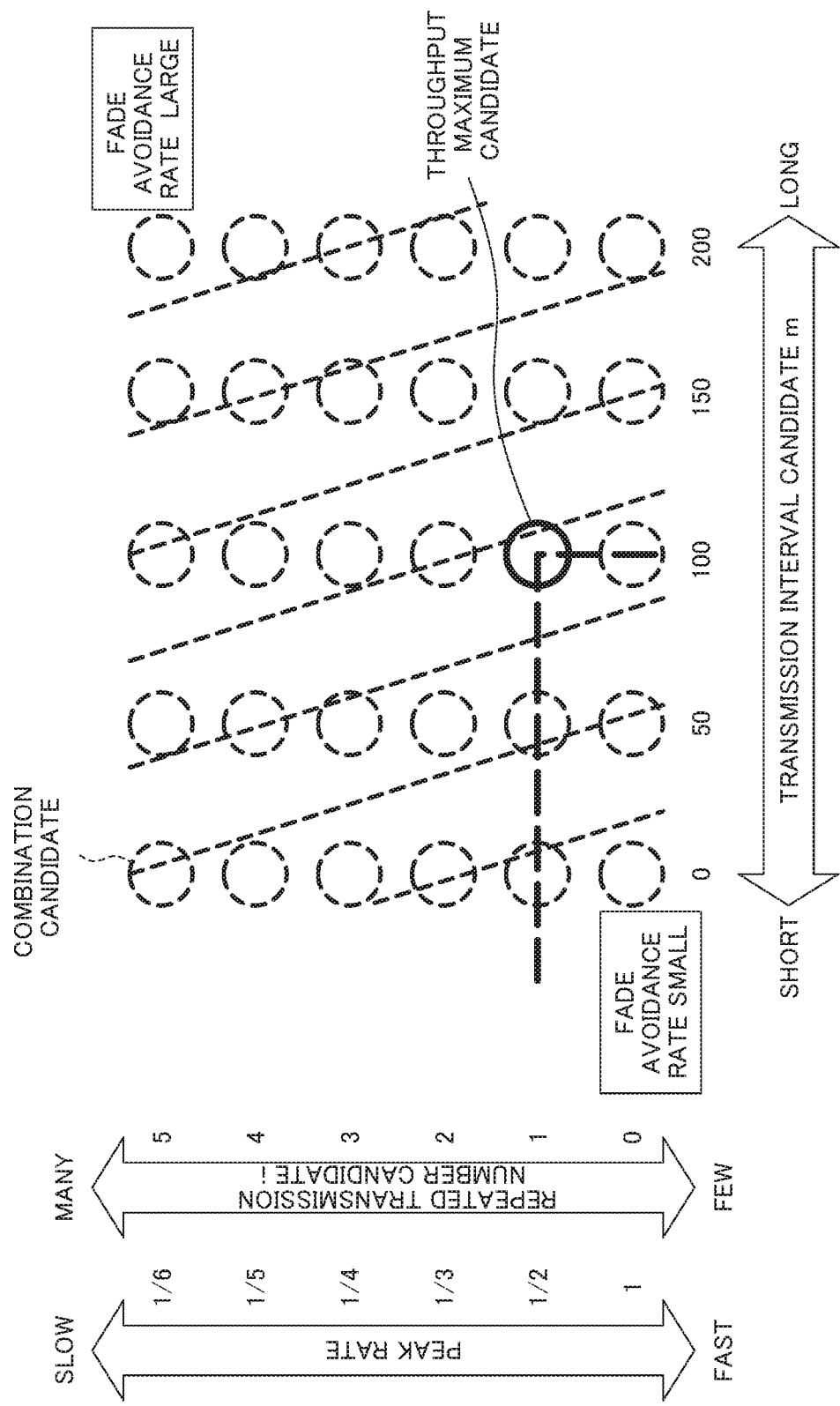
FIG. 4 is a diagram to explain the operation of a repeated transmission number/interval determining section included in the communication apparatus according to the second example embodiment of the present invention.

In FIG. 4, a dashed circle represents an optimum combination candidate, and an oblique dashed line represents a contour line where a fade avoidance rate has the same value. As can be seen in the figure, the fade avoidance rate increases as the repeated transmission number candidate i and the transmission interval candidate m increase; the fade avoidance rate decreases as the repeated transmission number candidate i and the transmission interval candidate m decrease. As the repeated transmission number candidate i increases, a peak rate that is a maximum value of transmission rates decreases. The repeated transmission number/interval determining section 230 determines a combination of a transmission number i' and a transmission interval m' by which a throughput (normalized throughput) is maximized that is obtained by taking into account the fade avoidance rate and a peak rate depending on the repeated transmission number candidate i, and outputs the combination to the transmitter-receiver 270.

Next, the operation, according to a line connection rate, of the repeated transmission number/interval determining section 230 will be described using FIG. 5A and FIG. 5B. The line connection rate means a ratio of a time outside a fade time with excellent communication quality to a time in a fade time with poor communication quality in a communication channel. The time variation in the line connection rate may be included in the time variation (history) in the communication quality information obtained by the communication apparatus 200.

Figure 5A:
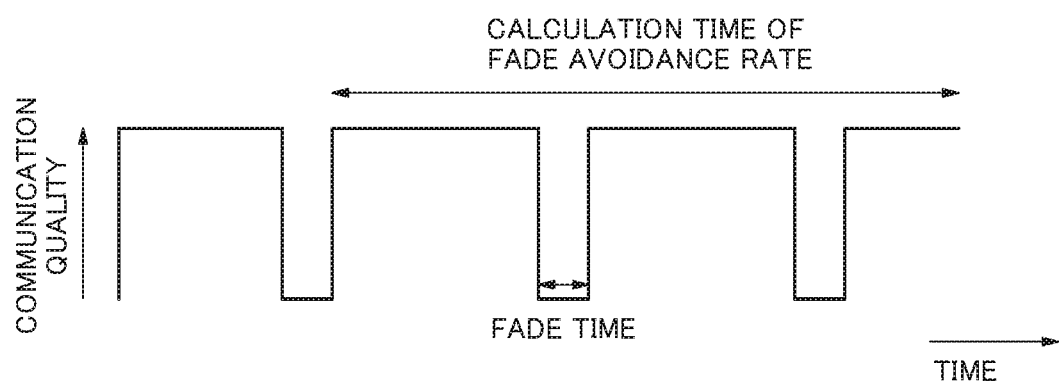
FIG. 5A is a diagram to explain the operation of the repeated transmission number/interval determining section included in the communication apparatus according to the second example embodiment of the present invention, with a high line connection rate.

FIG. 5A illustrates an example of fading with high line connection rate. When the line connection rate is high, the repeated transmission number is set at one, and the transmission interval is set at a value equal to or larger than the fade time, for example.

Figure 5B:
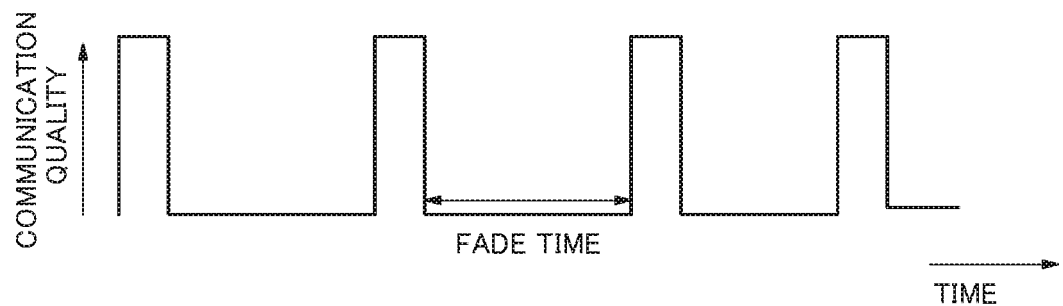
FIG. 5B is a diagram to explain the operation of the repeated transmission number/interval determining section included in the communication apparatus according to the second example embodiment of the present invention, with a low line connection rate.

On the other hand, FIG. 5B illustrates an example of fading with low line connection rate. When the line connection rate is low, in order to increase the appearance probability of a packet transmitted outside the fade time, the repeated transmission number is set at more than once, and the transmission interval is set at a value equal to or smaller than the fade time, for example.

The above-described operation of the repeated transmission number/interval determining section 230 makes it possible to avoid the degradation of the communication quality due to fading and maximize the throughput.

It is often the case that the fading characteristics have a correlation in the time direction. As mentioned above, the communication apparatus 200 of the present example embodiment is configured to calculate the fade avoidance rate and the throughput with reference to a history within a most recent predetermined time of the binarized communication quality information, determine the repeated transmission number and the transmission interval, and reflect the determined number of times of the repeated transmission and the transmission interval in transmission and reception processing. Consequently, it is possible, with reference to a history of most recent communication quality information, to reflect the history in determination of the repeated transmission number and the transmission interval. Therefore, the communication apparatus 200 of the present example embodiment enables the operation for determining the repeated transmission number and the transmission interval to follow fading characteristics.

If the processing of determining the repeated transmission number and the transmission interval is executed on a transmission side, the communication quality information such as optical intensity and SNR that is measured on a reception side can be fed back to the transmission side. The transmission side determines the repeated transmission number and the transmission interval according to the communication quality information that is fed back. The transmission and reception can be performed sharing the determined number of times of repeated transmission and the transmission interval between the transmission side and the reception side.

As mentioned above, the communication apparatus 200 of the present example embodiment is configured to control the repeated transmission number and the transmission interval in order to maximize a throughput. In addition, it is possible to ensure the reachability of a packet by being used in conjunction with a retransmission control of a packet arrival confirmation type in a higher-level layer.

Figure 6:
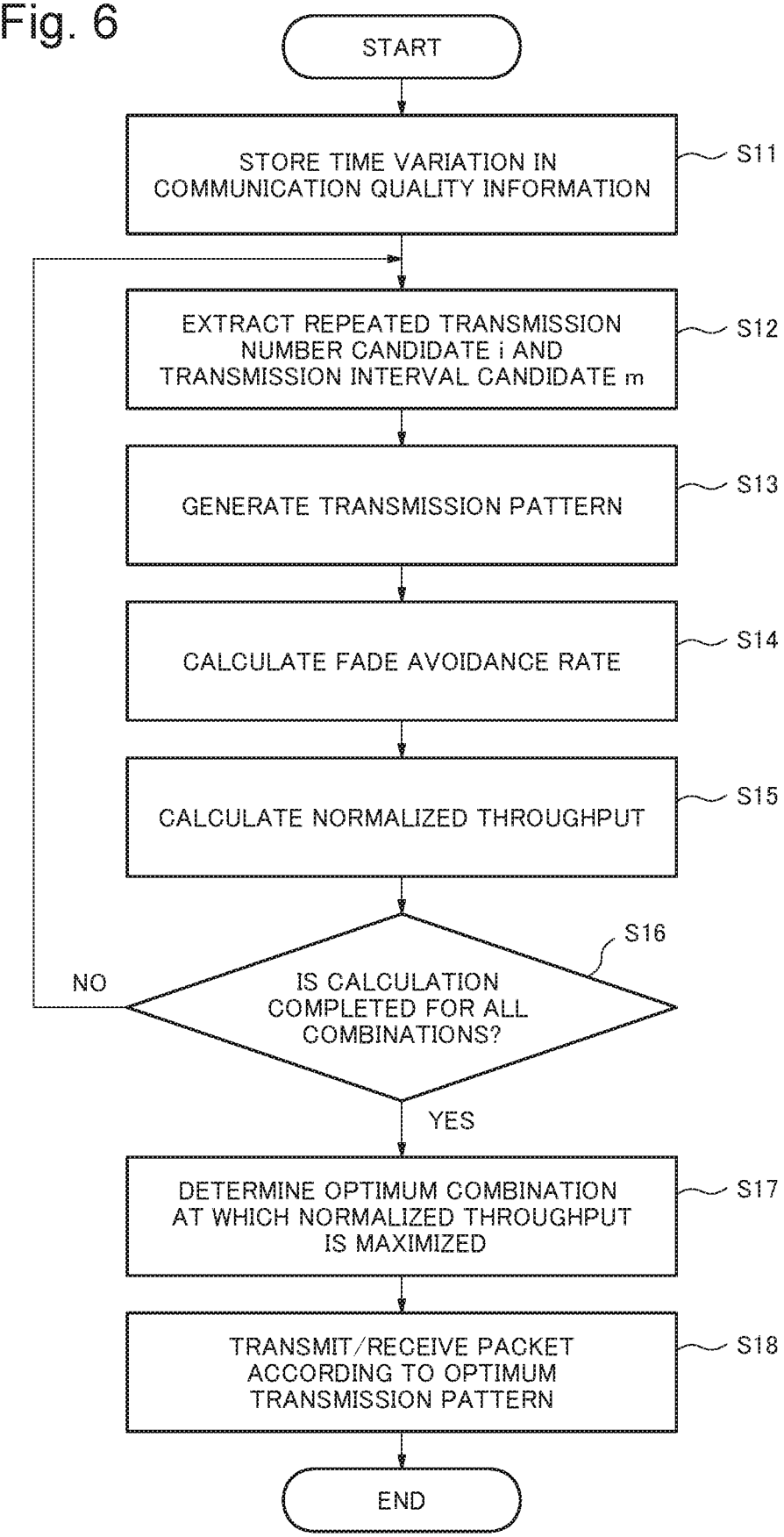
FIG. 6 is a flowchart to explain a communication method according to the second example embodiment of the present invention.

Next, a communication method according to the present example embodiment will be described. FIG. 6 is a flowchart to explain the communication method according to the present example embodiment.

In the communication method according to the present example embodiment, first, a time variation (history) of communication quality information is stored (step S11). A repeated transmission number candidate i and a transmission interval candidate m are extracted from among combinations of the number of times of repeated transmission and a transmission interval of communication packets (step S12).

And a transmission pattern is generated based on the extracted repeated transmission number candidate i and the transmission interval candidate m (step S13).

Subsequently, a fade avoidance rate is calculated with respect to each combination from a history of the communication quality information, and from a transmission pattern determined based on a combination of the repeated transmission number candidate i and the transmission interval candidate m (step S14). From the fade avoidance rate and the repeated transmission number i, a normalized throughput is calculated with respect to each combination of the repeated transmission number candidate i and the transmission interval candidate m (step S15).

Then it is determined whether or not the calculation of the normalized throughput is completed for all the combinations of the repeated transmission number candidate i and the transmission interval candidate m (step S16). When the calculation of the normalized throughput is not completed for all the combinations (step S16/NO), the combination of the transmission number candidate i and the transmission interval candidate m is changed (step S12), and a transmission pattern is generated based on the transmission number candidate and the transmission interval candidate that have been changed (step S13).

When the calculation of the normalized throughput is completed for all the combinations (step S16/YES), an optimum combination (a transmission number i' and a transmission interval m') is determined at which the normalized throughput is maximized among the combinations of the transmission number candidate i and the transmission interval candidate m (step S17). A packet is transmitted and received according to the optimum transmission pattern based on the determined optimum combination (step S18).

The above completes the processing according to the communication method of the present example embodiment.

As described above, the communication apparatus 200 and the communication method of the present example embodiment make it possible to determine the optimum combination of the number of times of repeated transmission and the transmission interval depending on the fading state of the transmission path, and achieve high throughput performance. That is to say, according to the communication apparatus 200 and the communication method of the present example embodiment, it is possible to avoid degradation of communication quality due to fading and achieve sufficient throughput performance.

It is preferable, in a transmission path where a disconnection state is dominant, to increase the number of times of transmission than to lengthen a transmission interval. On the other hand, it is preferable, in a transmission path where a connection state is dominant, to lengthen a transmission interval than to increase the number of times of transmission.

Third Example Embodiment

Figure 7:
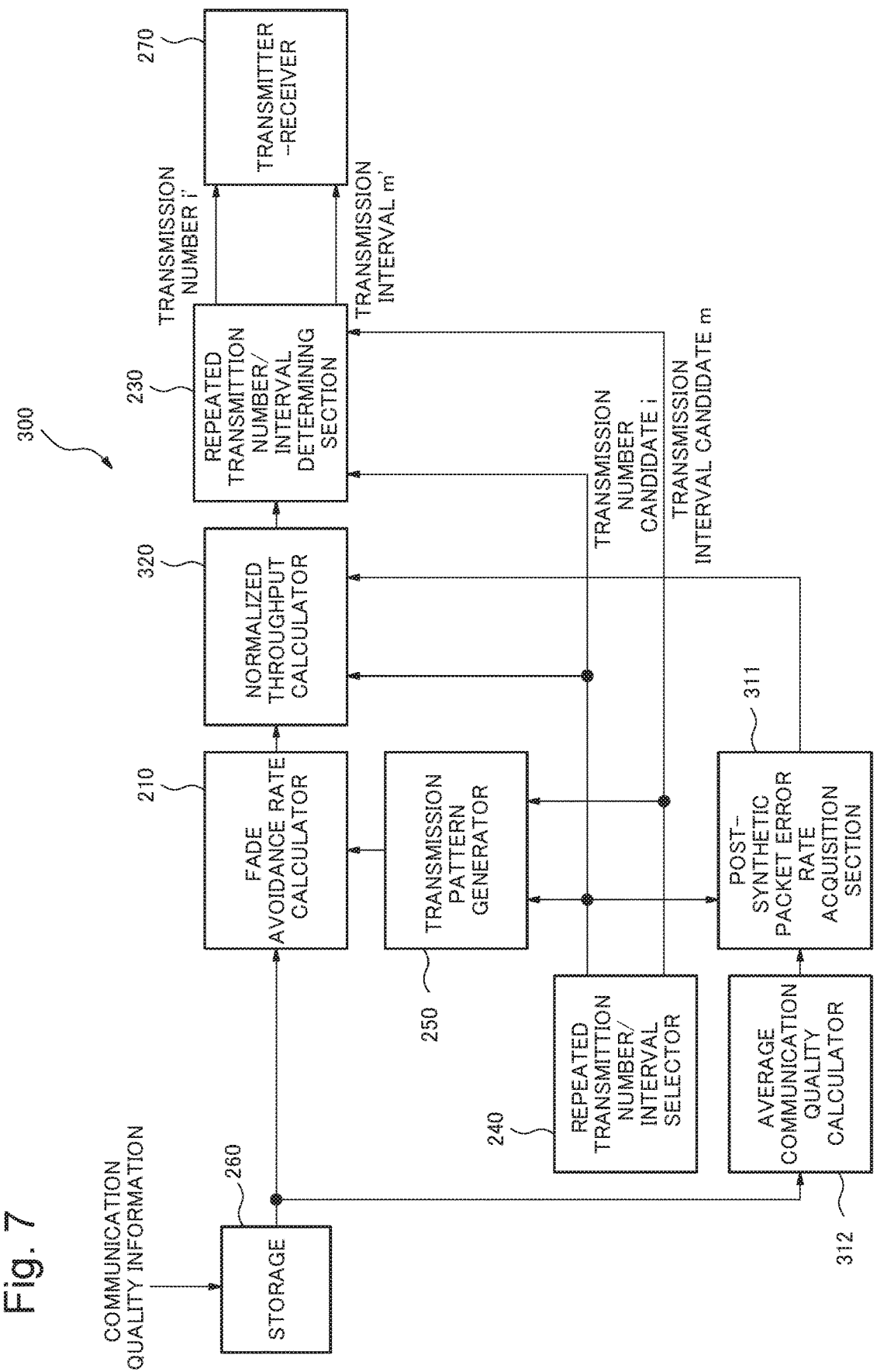
FIG. 7 is a block diagram illustrating a configuration of a communication apparatus according to a third example embodiment of the present invention.

Next, a third example embodiment of the present invention will be described. FIG. 7 illustrates a configuration of a communication apparatus 300 according to the third example embodiment of the present invention. The communication apparatus 300 according to the present example embodiment is configured to determine the number of times of repeated transmission and a transmission interval in consideration of performing coherent synthesis control on a reception side with regard to a plurality of same packets, in addition to a fading state of a transmission path.

The communication apparatus 300 according to the present example embodiment includes a fade avoidance rate calculator 210, a normalized throughput calculator 320, a repeated transmission number/interval determining section 230, a repeated transmission number/interval selector 240, and a transmission pattern generator 250. FIG. 7 illustrates the configuration also including a storage 260 and a transmitter-receiver 270. The configuration described above is similar to the configuration of the communication apparatus 200 according to the second example embodiment.

The communication apparatus 300 according to the present example embodiment further includes a post-synthetic packet error rate acquisition section (post-synthetic packet error rate acquisition means) 311. The post-synthetic packet error rate acquisition section 311 determines a packet error rate of communication packets that are repeatedly transmitted based on a time variation in communication quality information and the number of times of repeated transmission, and coherently synthesized. The normalized throughput calculator 320 serving as throughput calculation means calculates a throughput of the communication packets, from the number of times of repeated transmission, a fade avoidance rate, and the packet error rate, with respect to each combination.

As illustrated in FIG. 7, the communication apparatus 300 according to the present example embodiment may further include an average communication quality calculator (average communication quality calculation means) 312. The average communication quality calculator 312 averages communication quality information within a predetermined time and calculates average communication quality information. In this case, the post-synthetic packet error rate acquisition section 311 can determine the packet error rate based on the average communication quality information and the number of times of repeated transmission.

The communication apparatus 300 according to the present example embodiment illustrated in FIG. 7 will be described below in more detail. The detailed description of a component similar to that of the communication apparatus 200 according to the second example embodiment is not repeated.

The average communication quality calculator 312 receives input of a time variation (history) of communication quality information from the storage 260 and calculates an average value of the communication quality information within the most recent predetermined time. The average communication quality calculator 312 outputs the calculated average value of the communication quality to the post-synthetic packet error rate acquisition section 311. The average value of communication quality includes an S/N ratio and an average value of signal intensities.

The post-synthetic packet error rate acquisition section 311 receives input of an average value of communication quality from the average communication quality calculator 312. The post-synthetic packet error rate acquisition section 311 also receives input of a repeated transmission number candidate i from the repeated transmission number/interval selector 240. The post-synthetic packet error rate acquisition section 240 calculates, based on the average value of the communication quality and the repeated transmission number candidate i, a packet error rate after coherent synthesis of the same packet.

The packet error rate is defined as a ratio of "the number of packets received successfully" to "the total number of transmission packets". With regard to the packer error rate, the relation between an average value λ of communication quality and the packet error rate can be previously calculated based on experiment or simulation, and stored on a table, for example. The post-synthetic packet error rate acquisition section 240 can obtain a packet error rate by referring to the table.

The packet error rate after coherent synthesis may be obtained by correcting communication quality and packet error rate characteristics that are previously stored, according to a communication quality gain by coherent synthesis. The post-synthetic packet error rate acquisition section 311 may directly receive input of a history of communication quality information from the storage 260 without passing through the average communication quality calculator 312, and calculate a packet error rate after coherent synthesis.

The post-synthetic packet error rate acquisition section 311 outputs a packet error rate after coherent synthesis to the normalized throughput calculator 320.

The normalized throughput calculator 320 receives input of a fade avoidance rate from the fade avoidance rate calculator 210, and receives input of a repeated transmission number candidate i from the repeated transmission number/interval selector 240. In addition, the normalized throughput calculator 320 receives input of a packet error rate after coherent synthesis from the post-synthetic packet error rate acquisition section 311. The normalized throughput calculator 320 calculates a normalized throughput based on the fade avoidance rate r, the repeated transmission number candidate i, and the packet error rate after synthesis.

The normalized throughput T(i, m) is expressed, for example, by following formula (2), where a packet error rate after coherent synthesis with the repeated transmission number candidate i and the average value λ of communication quality is represented by e(i, λ).

$$T(i, m) = \frac{r(i, m) \cdot (1 - e(i, \lambda))}{i + 1} \quad (2)$$

The normalized throughput calculator 320 outputs the calculated normalized throughput to the repeated transmission number/interval determining section 230.

Next, using FIG. 8, the method will be described by which the repeated transmission number/interval determining section 230 determines a combination of a transmission number candidate i and a transmission interval candidate m by which a throughput is maximized.

Figure 8:
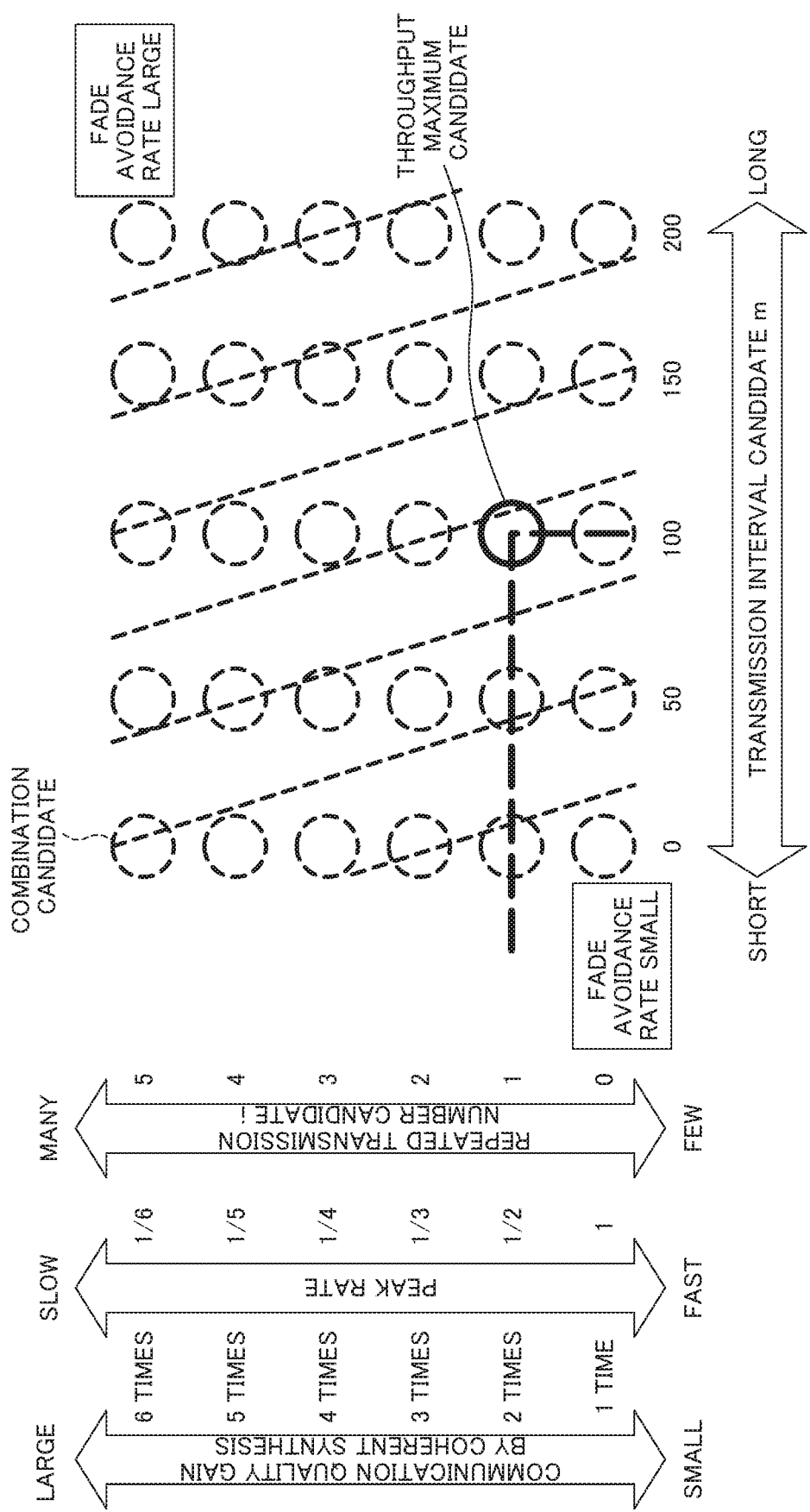
FIG. 8 is a diagram to explain the operation of a repeated transmission number/interval determining section included in the communication apparatus according to the third example embodiment of the present invention.

In FIG. 8, a dashed circle represents an optimum combination candidate, and an oblique dashed line represents a contour line where a fade avoidance rate has the same value. As can be seen in the figure, the communication quality gain by coherent synthesis increases as the repeated transmission number candidate i increases; consequently, the packet error rate decreases. The repeated transmission number/interval determining section 230 determines a transmission number i' and a transmission interval m' by which a throughput is maximized that is obtained by taking into account the fade avoidance rate r, and the communication quality gain by a peak rate depending on the repeated transmission number candidate i and coherent synthesis. The repeated transmission number/interval determining section 230 outputs the determined transmission number i' and transmission interval m' to the transmitter-receiver 270.

Figure 9:
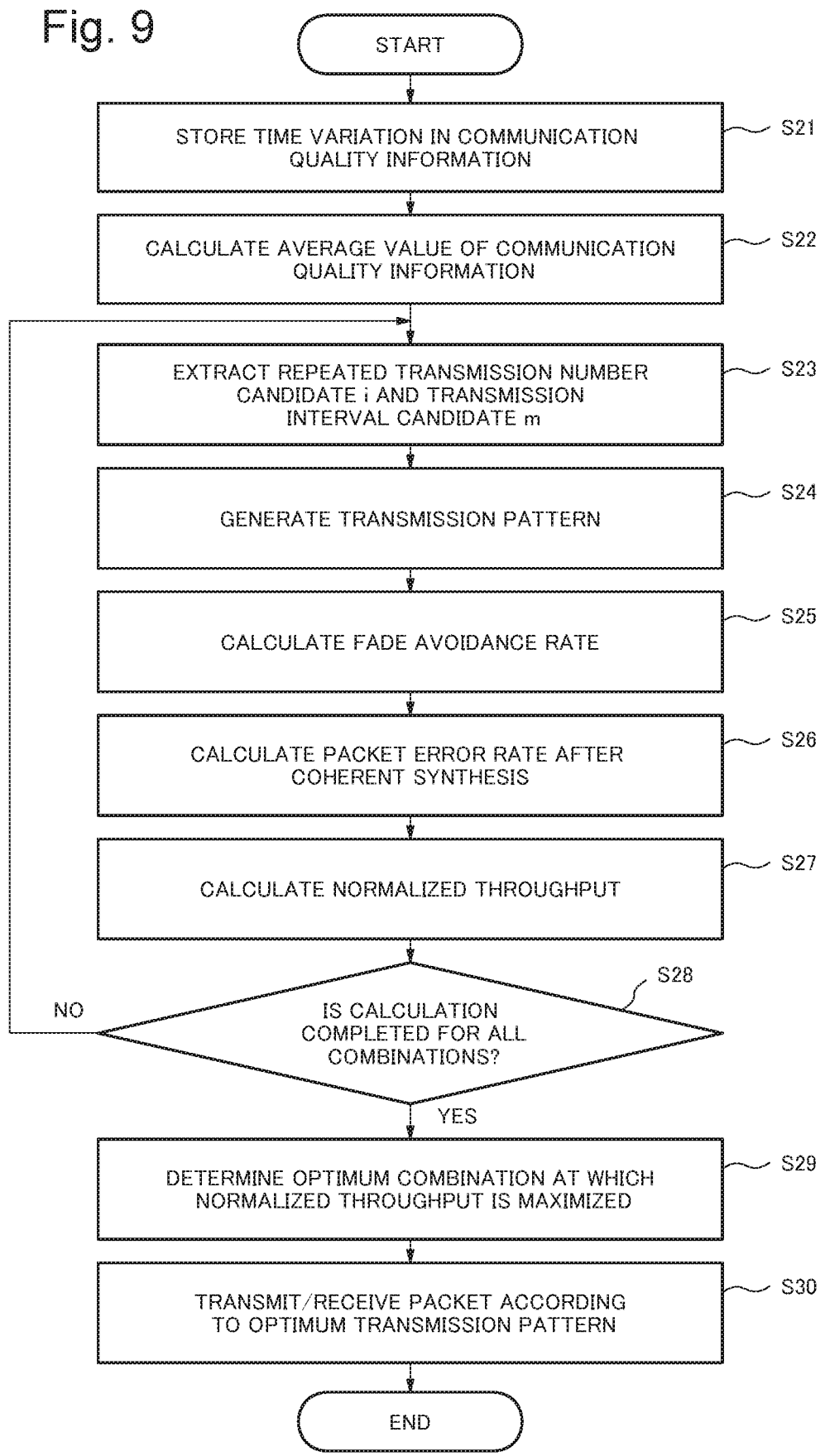
FIG. 9 is a flowchart to explain a communication method according to the third example embodiment of the present invention.

Next, a communication method according to the present example embodiment will be described. FIG. 9 is a flowchart to explain the communication method according to the present example embodiment.

In the communication method according to the present example embodiment, first, a time variation (history) of communication quality information is stored (step S21). An average value of the communication quality information within the most recent predetermined time is calculated (step S22).

A repeated transmission number candidate i and a transmission interval candidate m are extracted from among combinations of the number of times of repeated transmission and a transmission interval of communication packets (step S23). And a transmission pattern is generated based on the extracted repeated transmission number candidate i and the transmission interval candidate m (step S24). Subsequently, a fade avoidance rate is calculated with respect to each combination from a history of the communication quality information, and from a transmission pattern determined based on a combination of the repeated transmission number candidate i and the transmission interval candidate m (step S25).

A packet error rate after coherent synthesis is calculated based on the repeated transmission number candidate i and average communication quality information (step S26). From the packet error rate e(i, λ) after coherent synthesis, the fade avoidance rate r(i, m), and the repeated transmission number candidate i, a normalized throughput is calculated with respect to each combination of a repeated transmission number candidate i and a transmission interval candidate m (step S27).

Then it is determined whether or not the calculation of the normalized throughput is completed for all the combinations of the repeated transmission number candidate i and the transmission interval candidate m (step S28). When the calculation of the normalized throughput is not completed for all the combinations (step S28/NO), the combination of the transmission number candidate i and the transmission interval candidate m is changed (step S23). A transmission pattern is generated based on the transmission number candidate and the transmission interval candidate that have been changed (step S24).

When the calculation of the normalized throughput is completed for all the combinations (step S28/YES), an optimum combination (a transmission number i' and a transmission interval m') is determined at which the normalized throughput is maximized among the combinations of the transmission number candidate i and the transmission interval candidate m (step S29). A packet is transmitted and received according to the optimum transmission pattern based on the determined optimum combination (step S30).

The above completes the processing according to the communication method of the present example embodiment.

As described above, the communication apparatus 300 and the communication method of the present example embodiment make it possible to determine the optimum combination of the number of times of repeated transmission and the transmission interval depending on the fading state of the transmission path, and achieve high throughput performance. That is to say, according to the communication apparatus 300 and the communication method of the present example embodiment, it is possible to avoid degradation of communication quality due to fading and achieve sufficient throughput performance.

Further, the communication apparatus 300 and the communication method according to the present example embodiment are configured to determine the optimum combination of the number of times of repeated transmission and the transmission interval in consideration of the packet error rate after coherent synthesis, in addition to a fading state of a transmission path. Consequently, the throughput performance can be further improved.

Fourth Example Embodiment

Figure 10:
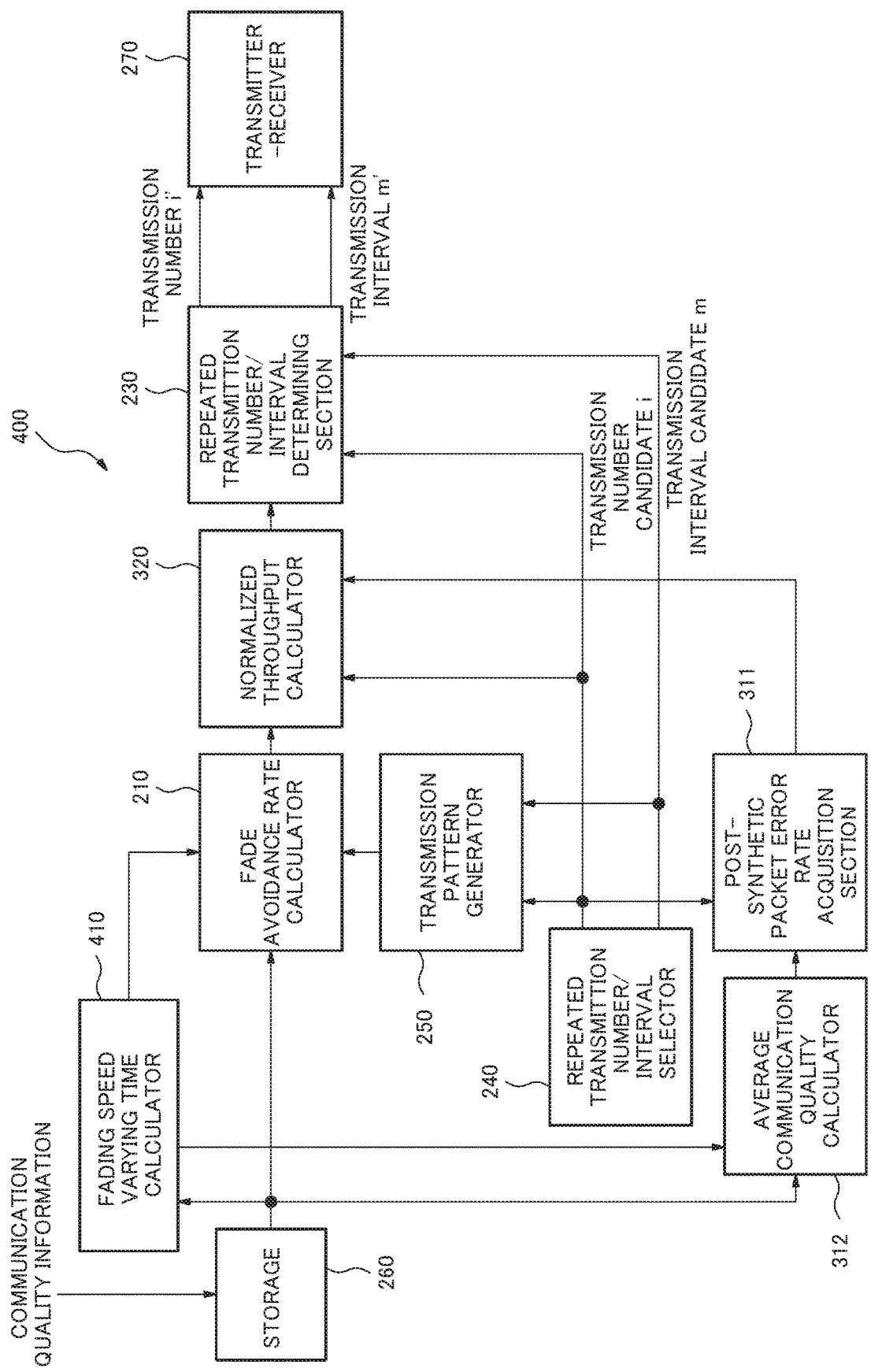
FIG. 10 is a block diagram illustrating a configuration of a communication apparatus according to a fourth example embodiment of the present invention.
Figure 11:
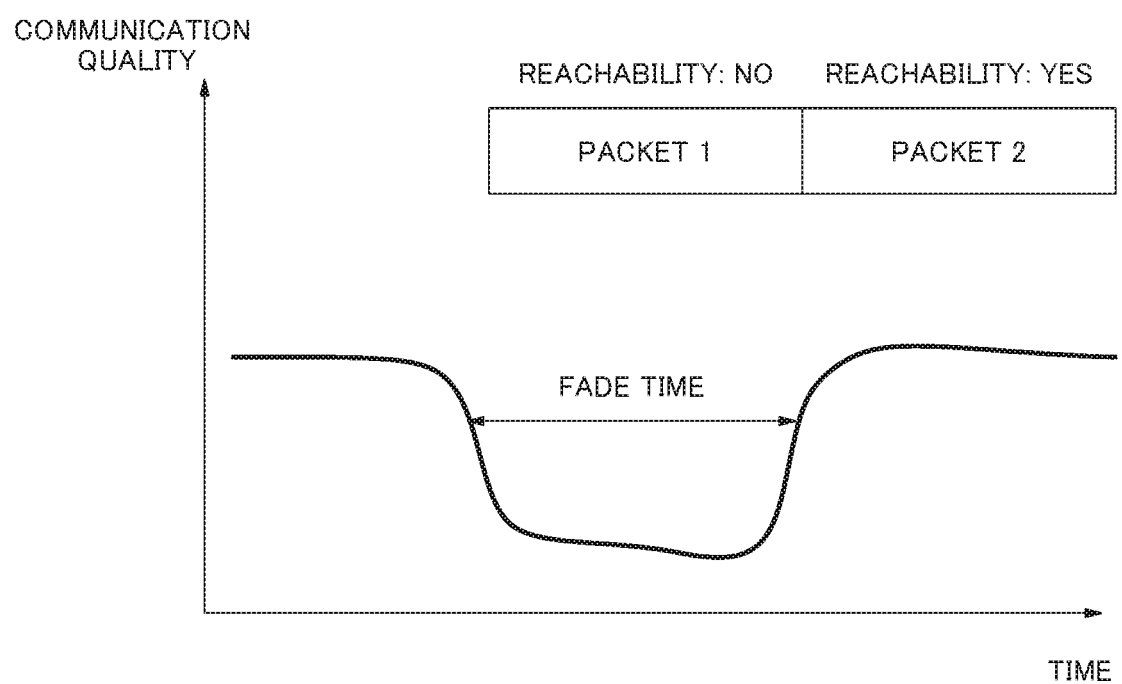
FIG. 11 is a schematic diagram to explain the relation between fading and reachability of communication packets.

Next, a fourth example embodiment of the present invention will be described. FIG. 10 illustrates a configuration of a communication apparatus 400 according to the fourth example embodiment of the present invention. The communication apparatus 400 according to the present example embodiment is configured to change, depending on a varying time of a fading speed, a calculation time of a fade avoidance rate and an average time of communication quality information.

In other words, the communication apparatus 400 according to the present example embodiment further includes a fading speed varying time calculator (fading speed varying time calculation means) 410 in addition to the configuration of the communication apparatus according to each example embodiment described above. FIG. 10 illustrates a configuration in which the fading speed varying time calculator 410 is added to the configuration of the communication apparatus 300 according to the third example embodiment. The other configurations are similar to the configuration and the operation of the communication apparatus according to each example embodiment described above; consequently, their descriptions are not repeated.

The fading speed varying time calculator 410 calculates, based on a time variation in communication quality information, a fading speed varying time when the variation in a fading speed is regarded as constant. Specifically, the fading speed varying time calculator 410 refers to a time variation (history) of time-series communication quality information output from the storage 260, and calculates a time when the variation in the fading speed is regarded as constant.

At that time, the fade avoidance rate calculator 210 calculates a fade avoidance rate based on the fading speed varying time. In other words, when the varying time of the fading speed is long, the fade avoidance rate calculator 210 lengthens the calculation time of the fade avoidance rate. On the other hand, when the varying time of the fading speed is short, the fade avoidance rate calculator 210 shortens the calculation time of the fade avoidance rate.

With the average communication quality calculator 312 as illustrated in FIG. 10, the average communication quality calculator 312 calculates average communication quality information based on the fading speed varying time. In other words, when the varying time of the fading speed is long, the average communication quality calculator 312 lengthens the time for which the communication quality information is averaged. On the other hand, when the varying time of the fading speed is short, the average communication quality calculator 312 shortens the time for which the communication quality information is averaged.

As described above, the communication apparatus 400 of the present example embodiment make it possible to determine the optimum combination of the number of times of repeated transmission and the transmission interval depending on the fading state of the transmission path, and achieve high throughput performance. That is to say, according to the communication apparatus 400 of the present example embodiment, it is possible to avoid degradation of communication quality due to fading and achieve sufficient throughput performance.

Further, the communication apparatus 400 of the present example embodiment makes it possible to calculate the fade avoidance rate and the average communication quality information depending on the varying time of the fading speed. This improves the accuracy for following the fading in the transmission path when the number of times of repeated transmission and the transmission interval are determined. As a result, the throughput performance can be further improved.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-028058, filed on Feb. 17, 2017, the disclosure of which is incorporated herein in its entirety by reference.

REFERENCE SIGNS LIST 100, 200, 300, 400 Communication apparatus
110, 210 Fade avoidance rate calculator
120 Throughput calculator
130 Transmission pattern determining section
220, 320 Normalized throughput calculator
230 Repeated transmission number/interval determining section
240 Repeated transmission number/interval selector
250 Transmission pattern generator
260 Storage
270 Transmitter-receiver
311 Post-synthetic packet error rate acquisition section
312 Average communication quality calculator
410 Fading speed varying time calculator

What is claimed is:
1. A communication apparatus, comprising:
a fade avoidance rate calculator configured to calculate, from a time variation in communication quality information and a transmission pattern in transmitting a communication packet repeatedly, a fade avoidance rate of a probability that the communication packet lies outside a fade duration, with respect to each transmission pattern;
a throughput calculator configured to calculate, from the transmission pattern and the fade avoidance rate, a throughput of the communication packet with respect to each transmission pattern;
a transmission pattern determination section configured to determine an optimum transmission pattern, of the transmission pattern, by which the throughput is maximized;
a repeated transmission number/interval selector configured to select a combination of number of times of repeated transmission and a repeated transmission interval of the communication packet, and
a transmission pattern generator configured to generate the transmission pattern based on the combination, wherein
the fade avoidance rate calculator calculates the fade avoidance rate with respect to each combination,
the throughput calculator calculates, from the number of times of repeated transmission and the fade avoidance rate, the throughput of the communication packet with respect to each combination, and the transmission pattern determination section determines the optimum transmission pattern based on an optimum combination, of the combination, by which the throughput is maximized.

2. The communication apparatus according to claim 1, further comprising
a post-synthetic packet error rate acquisition section configured to determine a packet error rate of communication packets that are repeatedly transmitted based on a time variation in the communication quality information and the number of times of repeated transmission, and coherently synthesized, wherein
the throughput calculator calculates the throughput of the communication packet with respect to each combination from the number of times of repeated transmission, the fade avoidance rate, and the packet error rate.

3. The communication apparatus according to claim 2, further comprising
an average communication quality calculator configured to average the communication quality information within a predetermined time and calculate average communication quality information, wherein
the post-synthetic packet error rate acquisition section determines the packet error rate based on the average communication quality information and the number of times of repeated transmission.

4. The communication apparatus according to claim 3, further comprising
a fading speed varying time calculator configured to calculate, based on a time variation in the communication quality information, a fading speed varying time when a variation in a fading speed is regarded as constant, wherein
the average communication quality calculator calculates the average communication quality information based on the fading speed varying time.

5. A communication method, comprising:
calculating, from a time variation in communication quality information and a transmission pattern in transmitting a communication packet repeatedly, a fade avoidance rate of a probability that the communication packet lies outside a fade duration, with respect to each transmission pattern;
calculating, from the transmission pattern and the fade avoidance rate, a throughput of the communication packet with respect to each transmission pattern;
determining an optimum transmission pattern, of the transmission pattern, by which the throughput is maximized;
selecting a combination of number of times of repeated transmission and a repeated transmission interval of the communication packet, and
generating the transmission pattern based on the combination, wherein
the calculating of the fade avoidance rate includes calculating the fade avoidance rate with respect to each combination,
the calculating of the throughput includes calculating, from the number of times of repeated transmission and the fade avoidance rate, the throughput of the communication packet with respect to each combination, and
the determining of the optimum transmission pattern includes determining the optimum transmission pattern based on an optimum combination, of the combination, by which the throughput is maximized.

6. The communication method according to claim 5, further comprising
determining a packet error rate of communication packets that are repeatedly transmitted based on a time variation in the communication quality information and the number of times of repeated transmission, and coherently synthesized, wherein
the calculating of the throughput includes calculating the throughput of the communication packet with respect to each combination from the number of times of repeated transmission, the fade avoidance rate, and the packet error rate.

7. The communication apparatus according to claim 1, further comprising
a fading speed varying time calculator configured to calculate, based on a time variation in the communication quality information, a fading speed varying time when a variation in a fading speed is regarded as constant, wherein
the fade avoidance rate calculator calculates the fade avoidance rate based on the fading speed varying time.

8. The communication apparatus according to claim 2, further comprising
a fading speed varying time calculator configured to calculate, based on a time variation in the communication quality information, a fading speed varying time when a variation in a fading speed is regarded as constant, wherein
the fade avoidance rate calculator calculates the fade avoidance rate based on the fading speed varying time.

9. The communication apparatus according to claim 3, further comprising
a fading speed varying time calculator configured to calculate, based on a time variation in the communication quality information, a fading speed varying time when a variation in a fading speed is regarded as constant, wherein
the fade avoidance rate calculator calculates the fade avoidance rate based on the fading speed varying time.

10. The communication apparatus according to claim 4, further comprising
a fading speed varying time calculator configured to calculate, based on a time variation in the communication quality information, a fading speed varying time when a variation in a fading speed is regarded as constant, wherein
the fade avoidance rate calculator calculates the fade avoidance rate based on the fading speed varying time.

11. The communication apparatus according to claim 1, further comprising
a storage configured to store a time variation in the communication quality information, and
a transmitter-receiver configured to transmit and receive the communication packet based on the optimum transmission pattern.

12. The communication apparatus according to claim 2, further comprising
a storage configured to store a time variation in the communication quality information, and
a transmitter-receiver configured to transmit and receive the communication packet based on the optimum transmission pattern.

13. The communication apparatus according to claim 3, further comprising
a storage configured to store a time variation in the communication quality information, and a transmitter-receiver configured to transmit and receive the communication packet based on the optimum transmission pattern.

14. The communication apparatus according to claim 4, further comprising
- a storage configured to store a time variation in the communication quality information, and
- a transmitter-receiver configured to transmit and receive the communication packet based on the optimum transmission pattern.

15. The communication apparatus according to claim 7, further comprising
- a storage configured to store a time variation in the communication quality information, and
- a transmitter-receiver configured to transmit and receive the communication packet based on the optimum transmission pattern.

* * * * *